(No Model.)

J. FOUNTAIN.
TAPE MEASURE.

No. 353,851. Patented Dec. 7, 1886.

WITNESSES:
J. D. Larfield
C. Sedgwick

INVENTOR:
J. Fountain
BY Munn & Co.
ATTORNEYS.

United States Patent Office.

JEROME FOUNTAIN, OF LA GRANDE, OREGON.

TAPE-MEASURE.

SPECIFICATION forming part of Letters Patent No. 353,851, dated December 7, 1886.

Application filed June 14, 1886. Serial No. 205,081. (No model.)

*To all whom it may concern:*

Be it known that I, JEROME FOUNTAIN, of La Grande, in the county of Union and State of Oregon, have invented new and useful Improvements in Tape-Lines, of which the following is a specification, reference being had to the annexed drawings, forming a part thereof, in which—

Figure 1:
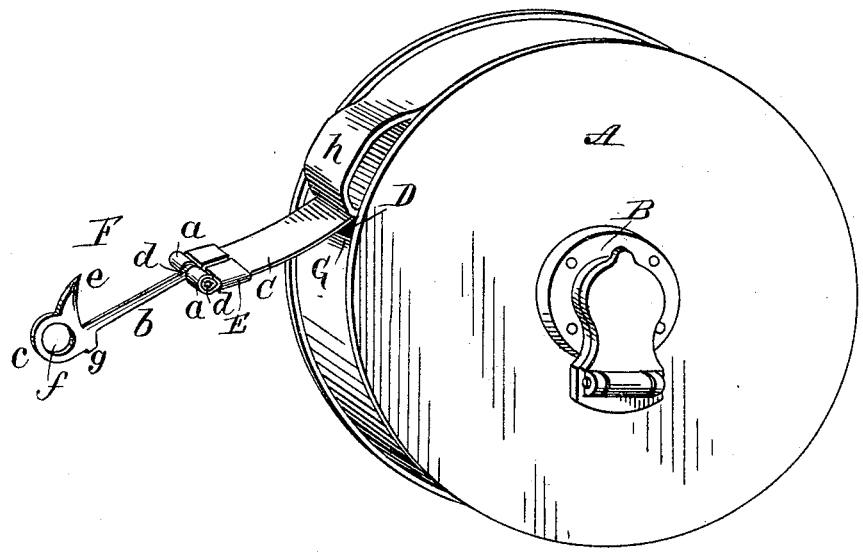
Figure 2:
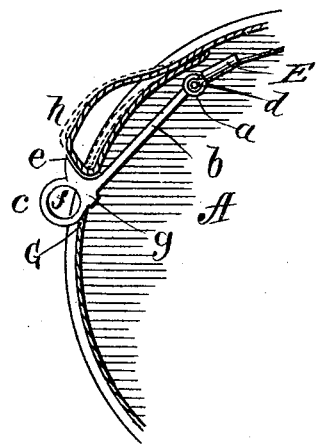

Figure 1 is a perspective view of a tape-line to which my improvement has been applied. Fig. 2 is a side sectional elevation.

Similar letters of reference indicate corresponding parts in both figures of the drawings.

An ordinary tape-line, when used by one person, requires fastening at the end before it can be unrolled and employed in making measurements. The means commonly employed for fastening the end of a tape line are not connected with the line, and frequently time is wasted in searching for an awl or knife or a suitable weight for holding the end of the line.

The object of my invention is to provide a simple and efficient fastener, permanently connected with the end of a line, for holding it while it is unrolled and used in making measurements.

My invention consists in a pointed hook jointed to the end of the tape-line and occupying the place of the first inch of the line.

It also consists in a spring-guard formed on or attached to the tape-line casing, for receiving and holding the end of the hook and preventing the hook from catching in the pockets or clothing of the user of the line.

The tape-line casing A is substantially of the usual form, and in the center thereof is journaled an arbor, B, upon which is wound the tape-line C, which extends through an opening, D, in one edge of the casing. To the outer end of the tape-line is secured a metallic clip, E, which incloses the end of the line and is provided with knuckles $a$. A hook, F, formed of the shank $b$, the head $c$, and the arms $d\,d$, arranged at right angles with the shank $b$ and in a plane at right angles with the head $c$, is connected with the tape-line C by the clip E, the arms $d\,d$ being received in the knuckles $a$. The head of the hook is provided with a sharp point, $e$, and in the head is formed an eye, $f$. The point $e$ is preferably arranged one inch from the end of the tape-line, and when the line is to be used the point $e$ is inserted in any suitable fixed object, when the line may be unrolled and used in the usual way. The eye $f$ of the hook F serves to receive an awl or the blade of a knife when it is found impracticable to employ the point $e$ of the hook.

The metal band forming the edges of the casing is bowed outward, then bent under or returned upon itself at one side of the opening D, forming a rounded support, $h$, for the hook $e$ when the line is wound up, and upon the opposite side of the opening D there is a beveled lip, G, under which a small lug, $g$, formed on the back of the hook F rests when the line is coiled within the casing A. The engagement of the lug $g$ with the beveled lip G is insured by the spring of the looped end of the band forming the edges of the casing.

It is obvious that I may form the support $h$ separately when the casing A is made of non-metallic material, and attach it to the casing by means of rivets, or in any other suitable way, and also that the hook may be varied in form and otherwise attached to the line.

Having thus described my invention, what I claim as new, and desire to secure by Letters Patent, is—

1. The combination, with a tape-line and the hook connected thereto, of the case having the metal band forming its circumference bowed outward and returned upon itself at one side of the opening through which the tape-line passes, substantially as and for the purpose set forth.

2. The combination, with the tape-line C, of the clip E, provided with knuckles $a$, and the hook F, having cross-arms $d$, received in the knuckles $a$, and provided with the point $e$ and the eye $f$, substantially as herein shown and described.

3. The combination, with the casing A and tape-line C, of the hook F, secured to the tape-line and provided with the lug $g$, and the rounded support $h$, attached to or formed upon the casing, substantially as herein shown and described.

JEROME FOUNTAIN.

Witnesses:
E. A. STEPHENS,
HENRY WILDEY.